J. R. GAMMETER.
METHOD AND APPARATUS FOR MANIPULATING FLEXIBLE ARTICLES.
APPLICATION FILED JAN. 16, 1922.

1,421,450. Patented July 4, 1922.

Inventor
John R. Gammeter.
By Robert N. Pierson
Atty.

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MANIPULATING FLEXIBLE ARTICLES.

1,421,450.      Specification of Letters Patent.      Patented July 4, 1922.

Continuation of application Serial No. 484,328, filed July 13, 1921. This application filed January 16, 1922. Serial No. 529,500.

*To all whom it may concern:*

Be it known that I, JOHN R. GAMMETER, a citizen of the United States, residing at Akron, in the county of Summit and State of Ohio, have invented a certain new and useful Method and Apparatus for Manipulating Flexible Articles, of which the following is a specification.

This invention relates to methods and apparatus for manipulating flexible articles, the apparatus illustrated in the accompanying drawings being adapted, for example, to spread open a pneumatic tire casing for purposes such as the removal or insertion of a core. The present application is a continuation of my application Serial No. 484,328, filed July 13, 1921, on method and apparatus for spreading hollow articles, and is partly for an improvement upon the invention of my co-pending application Serial No. 389,171, filed June 15, 1920, on method and apparatus for making tires.

My chief objects are to provide an improved method of spreading hollow, flexible articles, and an improved apparatus suitable for this and analogous manipulations of flexible articles, whereby labor and expense may be reduced. A further and more specific object is to provide apparatus for manipulating tire casings wherein the casing may be more readily inserted in or associated with the apparatus and removed therefrom than has been possible in the case of apparatus of this general character heretofore known.

Figure 1:
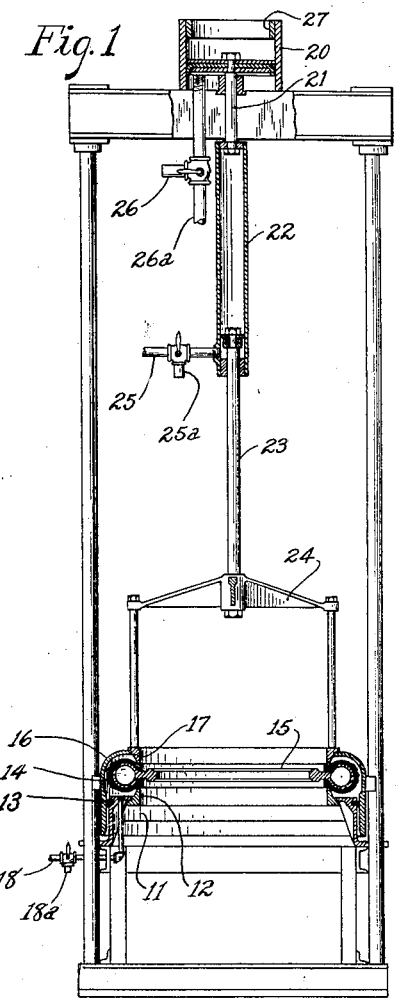
Fig. 1 is a side elevation, with parts broken away and parts in section, of a preferred embodiment of my invention, with the work in place.

Referring to the drawings, 10 is a frame in which is secured a lower annular suction member 11 provided at its inner periphery with an upwardly-extending annular flange 12 adapted to support a tire casing by engagement with one of the latter's beads, and at its outer periphery with a sealing member 13, preferably having the form of a lip packing, as shown. The member 11 constitutes a fixed piston. 14 is a tire casing resting upon the flange 12, and 15 is a collapsible core within said casing.

An upper, annular suction member 16 having a cylindrical portion is telescoped upon the lower suction member or piston 11, its inner surface coacting with the sealing member 13, said upper suction member being slidably mounted in the frame 10 and provided at its inner periphery with a downwardly-extending annular flange 17, adapted to rest upon the upper bead of the tire-casing and to effect a seal therewith, said lower and upper suction members thus forming an annular vacuum chamber about the tire casing. The inner wall of the upper suction member 16 may be flared at the bottom, as shown at 16$^a$, to facilitate its introduction to the lower suction member 11. 18 is a vacuum pipe provided with a common form of three-way valve and an air inlet 18$^a$, for exhausting the air from said chamber and for admitting air thereto, the valve preferably being so constructed that when desired the vacuum line may be shut off from the chamber without opening the air inlet. However, I do not wholly limit myself to this means for breaking the vacuum.

The preferred device shown for lifting the upper suction member 16 to spread the beads of the tire, and subsequently to lift said member out of the way, for the removal and insertion of the work, comprises a pair of cylinders 20, 22 mounted in tandem, one of said cylinders 20 being relatively short but large in diameter and mounted on the top of frame 10, its downwardly-extending piston rod 21 having mounted thereon, in extension thereof, the cylinder 22, which is relatively long and small in diameter. The piston rod 23 of the cylinder 22 is connected by a three-armed spider 24 with the upper suction member 16. 25 is a pipe provided with a common form of three-way valve and an exhaust nipple 25$^a$ for transmitting pressure fluid to the bottom of the cylinder 22 and for exhausting said cylinder, and 26, 26$^a$ is a similar pipe and valve assembly for the cylinder 20. The large upper cylinder 20 is provided with a piston stop 27 at its upper end and the lengths of the two cylinders and their connections are so proportioned that when the upper piston strikes said stop the tire casing will be opened a proper distance to permit the removal of the core, with the upper suction member 16 still engaging the sealing member 13, the parts then being substantially in the positions shown in Fig. 2.

Figure 2:
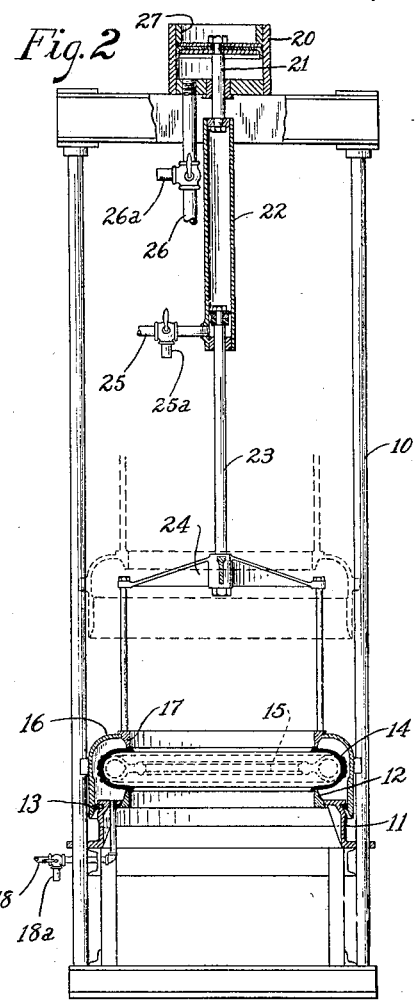
Fig. 2 is a similar view at a subsequent stage of the operation.
Figure 3:
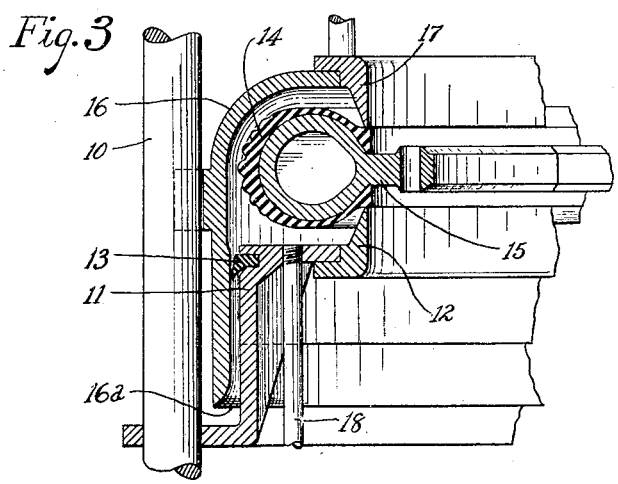
Fig. 3 is an enlarged sectional view of a part of the device.

In the operation of the device, the upper suction member 16 having been lifted out of the way by the cylinders 20, 22 to the position indicated by dotted lines in Fig. 2, the tire 14 upon the core 15 is placed upon the flange 12 and the upper suction member 16, by exhausting said cylinders, is permitted to descend, telescoping with the lower member 11, to the position shown in Figs. 1 and 3, the flange 17 resting upon the upper bead of the tire. Suction is applied to the outer surface of the tire through the pipe 18 and the upper suction member 16 is then lifted to the position shown in full lines in Fig. 2 which may be done by admitting pressure fluid through the pipe 26 to the cylinder 20 only. I do not limit myself, however, to separately operating the fluid devices. The cylinder 20 by reason of its large diameter affords the relatively great force necessary to loosen the tire from its core, the lower piston 23 abutting the bottom of the cylinder 22. The suction in the chamber formed by the members 11 and 16 draws the beads of the tire apart with the flanges 12 and 17. The core is then collapsed and removed, and may be allowed to drop through the annular member 11. Then the vacuum is broken by opening the air inlet 18$^a$ and the upper suction member is raised out of the way by admitting pressure fluid through the pipe 25 to the cylinder 22, and the operation is repeated. If the device is so well constructed that leakage of air into the vacuum chamber is substantially prevented, the vacuum pipe 18 may be closed after it has served to reduce the air pressure in said chamber and further reduction of pressure therein will result from the enlargement of said chamber when the suction member 16 is lifted, the inlet nipple 18$^a$ being left closed until the tire has been spread and the core removed.

As the lower suction member 11 constitutes substantially the floor only of the vacuum chamber, the tire may be readily mounted and accurately positioned thereon when the upper suction member 16 is lifted out of the way, and readily removed therefrom when the operation is completed. Both of the suction members being of annular form, access to the work may readily be had through the central opening of either, as for the insertion or removal of a core or the inspection of the interior of a tire.

Modifications may be resorted to and the apparatus may be adapted to analogous uses without departing from the scope of my invention, and I do not wholly limit my claims to the specific construction shown.

I claim:

1. The method of spreading a hollow article which comprises holding one side of the article, holding the opposite side by means of a vacuum, and relatively separating the two holding means, while the vacuum is applied, to separate the sides of said article.

2. The method of spreading a hollow article which comprises applying a vacuum to the outer surface of the article, and spreading the vacuum applying means to spread the article by suction.

3. The method of spreading a hollow article which comprises forming a vacuum chamber with the outer surface of the article constituting a wall of said chamber and enlarging said chamber to spread the article by suction.

4. The method of spreading hollow articles which comprises forming a vacuum chamber, with the outer surface of the article constituting a wall of said chamber, and changing the shape of said chamber to spread the article by suction.

5. The method of spreading a tire casing which comprises applying a vacuum to the outer surface of said casing.

6. The method of spreading a tire casing which comprises holding one of the bead-portions of said casing and pulling the other bead-portion away therefrom by suction.

7. The method of spreading a tire casing which comprises holding one of the bead-portions of said casing by suction and pulling the other bead-portion away therefrom by suction.

8. The method of spreading a tire casing which comprises holding one of the bead-portions of said casing, applying a vacuum to the outer surface of the other bead-portion, and moving said vacuum applying means to pull the latter bead-portion away from the former.

9. Apparatus for manipulating an annular, flexible article comprising a lower suction member adapted to effect an annular seal with said article and to lie entirely below the uppermost part of said article, an upper suction member adapted to effect an annular seal with said article and therewith and with said lower suction member to form an annular vacuum chamber, said lower and upper suction members being arranged in telescoped relation with each other, and means for applying a vacuum to said chamber.

10. Apparatus for manipulating an annular, flexible article comprising a lower suction member constituting a piston and adapted to effect an annular seal with said article, an upper suction member telescoped on said piston and adapted to effect an annular seal with said article, and means for exhausting air from the inner surface of said suction members.

11. Apparatus for manipulating an annular, flexible article comprising a lower suction member adapted to effect an annular seal with said article and lying entirely below the uppermost part of said article, an upper suction member adapted to effect an annular seal with said article and therewith and with said lower suction member to form an annular vacuum chamber, one of said suction members being of annular form, permitting access to the work, and means for applying a vacuum to said chamber.

12. Apparatus for spreading a hollow article, said apparatus comprising a device for holding one side of the article, a vacuum-applying device for holding the opposite side, and means for moving apart said devices while the vacuum is applied.

13. Apparatus for spreading a hollow article comprising means for applying a vacuum to the outer surface of the article and means for spreading the vacuum applying means to cause parts of said article to move away from each other under suction with parts of said vacuum-applying means.

14. Apparatus for spreading a hollow article comprising means for forming a chamber with the outer surface of the article constituting a wall of said chamber, and means for enlarging said chamber to spread the article by suction.

15. Apparatus for spreading a hollow article comprising means for forming a chamber with the outer surface of the article constituting a wall of said chamber, means for applying a vacuum to said chamber, and means for changing the shape of said chamber to spread the article by suction.

16. Apparatus for spreading a hollow article comprising a pair of members adapted to apply a vacuum to different sides of the article, and means for moving one of said members relatively to the other to spread the article by suction.

17. Apparatus for spreading a tire-casing comprising means for holding one of the bead-portions of said tire-casing, means for applying a vacuum to the outer surface of the other bead-portion, and means for moving the vacuum applying means.

18. Apparatus for spreading a tire-casing comprising vacuum-applying means for holding one of the bead-portions of said tire-casing, means for applying a vacuum to the outer surface of the other bead portion, and means for moving one of said vacuum applying means relatively to the other.

19. Apparatus for spreading a tire-casing comprising a pair of telescoped vacuum-applying members adapted to form a chamber with a part of the surface of the tire-casing constituting a wall of said chamber, and means for moving one of said members relatively to the other to spread the article by suction.

20. Apparatus for spreading an annular, hollow article comprising a pair of telescoped vacuum-applying members adapted to form an annular chamber with a part of the surface of the article constituting a wall of said chamber, means for applying a vacuum to said chamber, and means for moving one of said members relatively to the other to spread the article by suction.

21. Apparatus for spreading a tire-casing comprising a member adapted to abut the tire-casing to apply a vacuum to the surface of the casing, means for moving said member to bend the casing by suction, means for breaking said vacuum to release the casing, and means for moving said member away from its operative position.

22. Apparatus for removing a tire-casing from its core comprising a pair of telescoped members adapted to form an annular chamber, with a part of the outer surface of the tire-casing constituting a wall of said chamber, means for moving one of said members relative to the other to spread said tire by suction in said chamber, and the means for moving one of said members out of telescoped relation to the other to permit the insertion of the next tire-casing.

23. Apparatus for removing a tire-casing from its core comprising a pair of telescoped members adapted to form an annular chamber, with a part of the outer surface of the tire-casing constituting a wall of said chamber, means for removing one of said members relative to the other to spread said tire by suction in said chamber, means for breaking the suction in said chamber to release the tire, and means for moving one of said members out of telescoped relation to the other to permit the insertion of the next tire-casing.

24. Apparatus for removing a tire-casing from its core comprising a pair of telescoped members adapted to form an annular chamber, with a part of the outer surface of the tire-casing constituting a wall of said chamber, means for applying a vacuum to said chamber, means for moving one of said members relative to the other to spread said tire by suction in said chamber, and the means for moving one of said members out of telescoped relation to the other to permit the insertion of the next tire-casing.

25. Apparatus for removing an article from a support comprising a member adapted to engage said article by suction, means for moving said member relative to said support to loosen the article from said support, and means connected in tandem with the aforesaid means for removing said member from the region of the work.

26. Apparatus of the character described comprising a member adapted to hold one bead portion of a tire, a vacuum-applying means for engaging the opposite bead portion by suction, and a plurality of cylinders and pistons mounted in tandem for imparting successive movements to said vacuum-applying means.

27. Apparatus of the character described comprising a member adapted to hold one bead portion of a tire, a vacuum-applying means for engaging the opposite bead portion by suction, a relatively short cylinder of large diameter, adapted to move said vacuum-applying means to loosen said tire from its core, and a relatively long cylinder of small diameter, adapted for further movement of said vacuum-applying means.

28. Apparatus of the character described comprising a member adapted to hold one bead portion of a tire, a vacuum-applying means for engaging the opposite portion by suction, a relatively short cylinder of large diameter adapted to move said vacuum-applying means to loosen said tire from its core, and a relatively long cylinder of small diameter adapted for further movement of said vacuum-applying means, said cylinders being mounted in tandem.

In witness whereof I have hereunto set my hand this 11th day of January, 1922.

JOHN R. GAMMETER.